Oct. 20, 1964     L. A. REDYKE     3,153,301

FLOWER POT COLLAR

Filed Oct. 5, 1960

INVENTOR.
LEAH A. REDYKE
BY W. B. Harpman
ATTORNEY

United States Patent Office 3,153,301
Patented Oct. 20, 1964

3,153,301
FLOWER POT COLLAR
Leah A. Redyke, 4316 Chester Drive,
Youngstown, Ohio
Filed Oct. 5, 1960, Ser. No. 60,622
1 Claim. (Cl. 47—34)

This invention relates to an accessory for a flower pot and more particularly to a collar for covering the upper annular edge of a flower pot.

The principal object of the invention is the provision of a flower pot collar that will enclose the annular upper edge of a flower pot and the annular outer and inner wall surfaces adjacent thereto.

A further object of the invention is the provision of a flower pot collar that may be used on flower pots of various diameters.

A still further object of the invention is the provision of a flower pot collar having a portion extending outwardly from the flower pot and forming an angularly disposed annular flange for supporting plants or flowers in the flower pot.

A still further object of the invention is the provision of a flower pot collar that will dress up the appearance of a flower pot so that a flower therein has the appearance of growing out of a bouquet rather than an ordinary flower pot.

The flower pot collar disclosed herein comprises a simple and inexpensive device which may be molded of suitable material or stamped from sheet plastic and like material and which may be easily positioned in a flower pot so as to enclose the upper annular edge thereof and the inner and the outer circular wall areas adjacent thereto. The device is light in weight and may be and preferably is formed with an ornamental peripheral edge.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
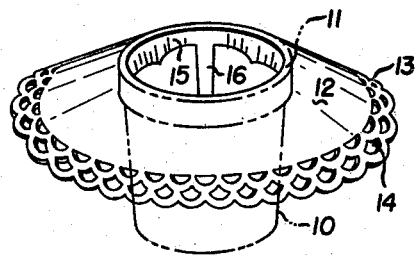
FIGURE 1 is a perspective view of the flower pot collar with broken lines showing the flower pot supporting the same.
Figure 2:
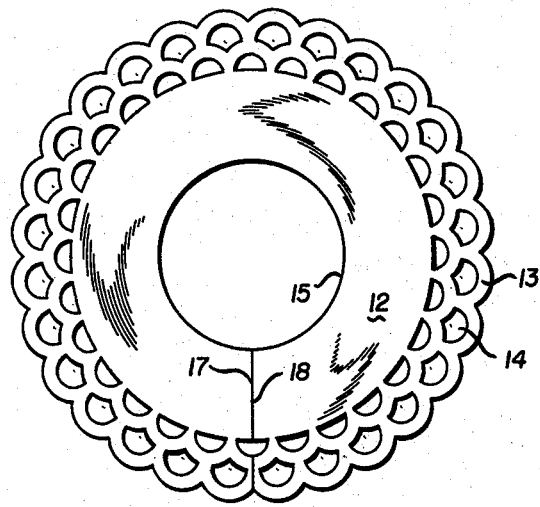
FIGURE 2 is a top plan view of the flower pot collar on an enlarged scale.

By referring to the drawings and FIGURES 1 and 2 in particular, it will be seen that a representation of the flower pot is shown in broken lines and as indicated by the numeral 10 and that it has an upper annular edge 11 which has been covered by a flower pot collar comprising an angularly disposed annular flange 12 having an outer ornamental peripheral edge 13 including a plurality of spaced apertures 14 and an inner downturned annular flange or band 15 from which a plurality of spaced arms 16 depend. The annular flange 15 and the arms 16 are located adjacent the inner circular wall of the flower pot 10 and that portion of the flower pot collar joining the annular flange 15 and the angularly disposed annular flange 12 is curved as may be seen by referring to FIGURES 3 and 4 of the drawings.

By referring now to FIGURE 2 of the drawings, a top plan view of the flower pot collar may be seen and it will be observed that the angularly disposed annular flange 12 is formed of a strip of material arranged with its ends 17 and 18 in abutting relation. It will thus be seen that the flower pot collar as disclosed herein forms a collar of predetermined diameter and that it may be used for smaller diameter flower pots by overlapping the ends 17 and 18 as will occur to those skilled in the art.

Figure 3:
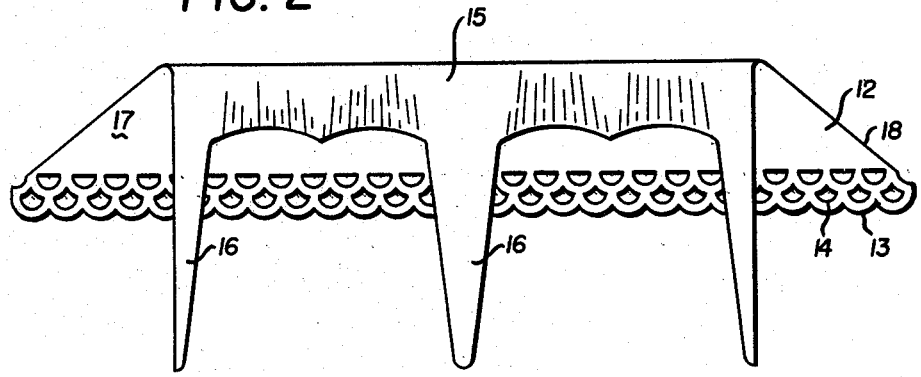
FIGURE 3 is a side view of the flower pot collar in open position.

By referring now to FIGURE 3 of the drawings, it will be seen that the flower pot collar may be formed as an appropriately shaped section of sheet material; for example, plastic, waterproof paper or cardboard, the collar being blanked and then folded on a longitudinal line and wherein the angularly disposed annular flange 12 and the ornamental edge 13 form a longitudinal strip with the flange 15 and the depending arms 16 positioned in spaced relation therealong.

Figure 4:
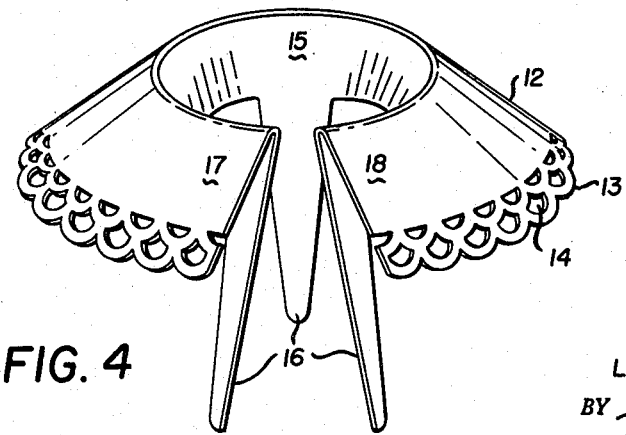
FIGURE 4 is a perspective view of the pot collar in partially completed shape.

In FIGURE 4 of the drawings the flower pot collar is shown partially shaped into its normal circular shape with the ends 17 and 18 of the angularly disposed annular flange 12 in spaced relation to one another. It will occur to those skilled in the art that the flower pot collar may be molded in circular finished shape if desired. The flower pot collar is installed in a flower pot by positioning the arms 16 downwardly along the inner surface of the circular wall of the flower pot and with the angularly disposed annular flange 12 positioned around the outside of the flower pot. The depending arm 16 will hold the flower pot collar in position without interfering with the flower or plant in the flower pot.

The angularly disposed annular flange 12 provides an attractive collar and a support for the leaves of the plant or flower and forms an ornamental background for the flower or plant considerably improving the appearance of the flower pot.

It will thus be seen that a flower pot collar meeting the several objects of the invention has been disclosed and having thus described my invention, what I claim is:

A flower pot collar comprising a blanked section of thin flexible sheet material having a principal elongated portion folded lengthwise, one part of said folded elongated portion being of greater length than the other part and the ends of the longer part being diagonal and oppositely disposed, the other part of said folded elongated portion having a plurality of spaced perpendicular arms thereon, said folded elongated portion arranged to be curved to position said diagonal ends in abutting relation whereby said other part of said folded elongated portion forms an annular flange with said perpendicular arms located in circumferentially spaced positions thereon.

References Cited in the file of this patent
UNITED STATES PATENTS

| 1,870,208 | Crosser | Aug. 2, 1932 |
| 2,785,508 | Coleman | Mar. 19, 1957 |

FOREIGN PATENTS

| 37,576 | Austria | June 11, 1909 |
| 743,604 | Germany | Dec. 29, 1943 |